United States Patent
Andre et al.

(10) Patent No.: US 10,458,578 B2
(45) Date of Patent: Oct. 29, 2019

(54) METHOD AND APPARATUS FOR REPAIRING A JET PUMP SLIP JOINT

(71) Applicants: Lee John Andre, Wilmington, NC (US); Jack Toshio Matsumoto, San Jose, CA (US)

(72) Inventors: Lee John Andre, Wilmington, NC (US); Jack Toshio Matsumoto, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 892 days.

(21) Appl. No.: 14/956,909

(22) Filed: Dec. 2, 2015

(65) Prior Publication Data

US 2017/0159857 A1 Jun. 8, 2017

(51) Int. Cl.
| | |
|---|---|
| *F16L 23/036* | (2006.01) |
| *F16L 55/18* | (2006.01) |
| *F04F 5/10* | (2006.01) |
| *F04F 5/46* | (2006.01) |
| *F04F 5/54* | (2006.01) |
| *G21C 15/25* | (2006.01) |
| *G21C 19/20* | (2006.01) |

(52) U.S. Cl.
CPC .............. *F16L 23/036* (2013.01); *F04F 5/10* (2013.01); *F04F 5/46* (2013.01); *F04F 5/54* (2013.01); *F16L 55/18* (2013.01); *G21C 15/25* (2013.01); *G21C 19/207* (2013.01); *Y02E 30/40* (2013.01)

(58) Field of Classification Search
CPC .. F16L 23/036; F16L 55/18; F04F 5/54; F04F 5/46; F04F 5/44; F04F 5/10; G21C 19/207; G21C 15/25; Y02E 30/40

USPC .......................................... 285/15, 364, 420
See application file for complete search history.

(56) References Cited

U.S. PATENT DOCUMENTS

| | | |
|---|---|---|
| 3,012,802 A | 12/1961 | Waite |
| 3,378,456 A | 4/1968 | Roberts |
| 3,595,588 A | 7/1971 | Rode |
| 3,761,102 A | 9/1973 | Nicholson |
| 4,285,770 A | 8/1981 | Chi et al. |
| 4,361,335 A | 11/1982 | Vinciguerra |
| 4,495,138 A | 1/1985 | Thevenin et al. |
| 4,602,795 A | 7/1986 | Lillibridge |
| 4,854,600 A | 8/1989 | Halling et al. |

(Continued)

FOREIGN PATENT DOCUMENTS

EP 2416017 A1 2/2012

*Primary Examiner* — Greg Binda
*Assistant Examiner* — Zachary T Dragicevich
(74) *Attorney, Agent, or Firm* — Harness, Dickey & Pierce, P.L.C.

(57) ABSTRACT

A jet pump slip joint repair assembly includes at least one clamp and a bushing configured to be inserted in a bore of a diffuser and to surround a portion of an inlet mixer. The clamp includes a gripping surface and a gripping collar. The bushing includes a generally cylindrical sidewall, the sidewall configured to surround the portion of the inlet mixer, a grooved flange on an upper surface of the sidewall, at least one cutout between adjacent portions of the grooved flange, and a groove on an inner, bottom surface of the sidewall. The assembly also includes a seal in the groove. The seal is flexible and formed of a metallic material. The seal is configured to be compressed when the at least one clamp engages the bushing.

14 Claims, 6 Drawing Sheets

(56) References Cited

U.S. PATENT DOCUMENTS

| | | |
|---|---|---|
| 6,438,192 B1 | 8/2002 | Erbes et al. |
| 6,587,535 B1 | 7/2003 | Erbes et al. |
| 6,932,353 B2 | 8/2005 | Amos et al. |
| 6,942,220 B2 | 9/2005 | Takahiro et al. |
| 7,073,796 B2 | 7/2006 | Tanioka et al. |
| 8,475,139 B2 | 7/2013 | Sprague et al. |
| 8,948,335 B2 | 2/2015 | Ellison et al. |
| 2008/0029969 A1 | 2/2008 | Torres |
| 2008/0031741 A1 | 2/2008 | Torres |
| 2008/0107227 A1* | 5/2008 | Koepke .................. G21C 15/25 285/420 X |
| 2009/0295155 A1* | 12/2009 | Keller-Staub ......... F16L 23/036 |
| 2011/0069804 A1 | 3/2011 | Lynch |
| 2012/0161441 A1* | 6/2012 | Hall ...................... F16L 23/036 |
| 2012/0219103 A1 | 8/2012 | Lynch |
| 2014/0079468 A1 | 3/2014 | Jensen et al. |
| 2014/0109406 A1 | 4/2014 | Golden et al. |

\* cited by examiner

METHOD AND APPARATUS FOR REPAIRING A JET PUMP SLIP JOINT

BACKGROUND

Field

The present disclosure relates to a method and apparatus for repairing a jet pump slip joint.

Description of Related Art

Boiling water reactors may include jet pumps having a slip joint feature in which flow through the pump is able to leak out of the slip joint. Leakage is limited to clearances between an inlet mixer and a diffuser. Leakage may result in leakage flow induced vibration, which leads to wear and degradation of the jet pump.

SUMMARY

At least one example embodiment relates to a method of repairing a jet pump slip joint.

In at least one example embodiment, a method of repairing a jet pump slip joint includes removing an inlet mixer from a bore of a diffuser, machining an inner surface of the bore of the diffuser so as to remove damaged metal and form a substantially smooth inner surface, machining an outer surface of the inlet mixer so as to remove damaged metal from the inlet mixer and form a substantially smooth outer surface, and inserting a bushing in the bore of the diffuser. The bushing includes a grooved flange on an upper surface. The grooved flange is configured to receive a gripping portion of a clamp. The bushing includes an internal groove on an inner, bottom surface of the bushing. A seal is inserted in the internal groove of the bushing.

In at least one example embodiment, the method may also include inserting the inlet mixer through the bushing and into the bore of the diffuser. The method may also include clamping the bushing to a collar of the diffuser such that the seal is compressed. The method may also include inserting the gripping portion of the clamp in the grooved flange of the upper surface of the bushing, and securing a gripping collar to the collar of the diffuser.

In at least one example embodiment, the method may also include mounting a slip joint clamp around the bushing, the diffuser, and the inlet mixer.

At least one example embodiment relates to a jet pump slip joint repair assembly.

In at least one example embodiment, a jet pump slip joint repair assembly includes at least one clamp and a bushing configured to be inserted in a bore of a diffuser and to surround a portion of an inlet mixer. The clamp includes a gripping surface and a gripping collar. The bushing includes a generally cylindrical sidewall. The sidewall is configured to surround the portion of the inlet mixer. The bushing also includes a grooved flange on an upper surface of the sidewall. The grooved flange is configured to receive the gripping surface of the clamp. At least one cutout is between adjacent portions of the grooved flange. The at least one cutout is configured to receive at least one portion of a slip joint clamp. The bushing also includes a groove on an inner, bottom surface of the sidewall. The assembly also includes a seal in the groove. The seal is flexible and formed of a metallic material. The seal is configured to be compressed when the at least one clamp engages the bushing.

In at least one example embodiment, the assembly includes at least two clamps. The at least two clamps apply at least about 2,000 pounds force to the bushing. When the bushing is inserted in the bore of the diffuser, a gap is formed between the grooved flange of the bushing and a top edge of the diffuser.

In at least one example embodiment, the gripping surface extends from a gripping body and the gripping body is configured to be inserted in the gripping collar. The gripping body has a generally square-shaped cross-section so as to reduce rotation of the gripping body in relation to the gripping collar. In at least one example embodiment, the gripping body has a generally non-round cross-section so as to reduce rotation of the gripping body in relation to the gripping collar.

At least one example embodiment relates to a jet pump slip joint.

In at least one example embodiment, the jet pump slip joint includes a diffuser including a bore extending therethrough. An inner surface of the bore has a substantially smooth surface. The jet pump slip joint also includes a bushing inserted in the bore. The bushing includes a generally cylindrical sidewall, a grooved flange on an upper surface of the sidewall, at least one cutout between adjacent portions of the grooved flange, and a groove on an inner, bottom surface of the sidewall. The grooved flange is configured to receive the gripping surface of the clamp. The jet pump slip joint also includes a seal inserted in the groove of the bushing, an inlet mixer inserted into the sidewall of the bushing and the bore of the diffuser, and at least one clamp engaged with the diffuser and the bushing. The at least one clamp is configured to compress the seal.

In at least one example embodiment, the seal is formed of a flexible, metallic material.

In at least one example embodiment, the at least one clamp includes a gripping surface and a gripping collar. The gripping surface extends from a gripping body. The gripping body has a generally square-shaped cross-section so as to reduce rotation of the gripping body in relation to the gripping collar.

In at least one example embodiment, the jet pump slip joint may also include a gap between the grooved flange of the bushing and a top edge of the diffuser. The jet pump slip joint may also include a slip joint clamp extending at least partially around the diffuser and the inlet mixer, at least a portion of the slip joint clamp positioned within the at least one cutout of the bushing.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

During operation of a boiling water reactor, a slip joint of a jet pump may leak. The leaks may result in vibration, which leads to wear and degradation of the jet pump. A jet pump slip joint repair assembly may re-establish the slip joint to an improved operable condition.

In at least one example embodiment, the jet pump slip joint repair assembly allows for continued use of an existing inlet mixer and/or diffuser. Moreover, the repair may be made and a bushing installed without disassembling and removing additional equipment.

At least one example embodiment relates to a jet pump slip joint repair assembly.

Figure 1:
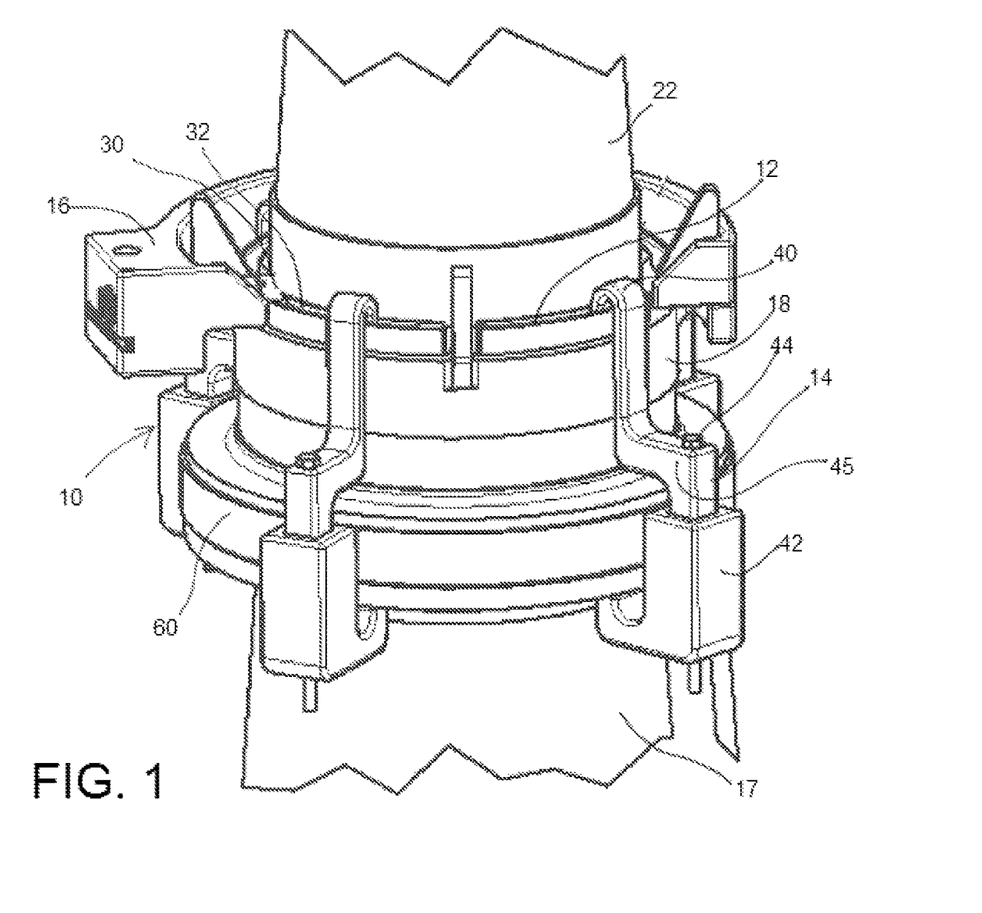
FIG. 1 is a perspective view of a jet pump slip joint repair assembly according to at least one example embodiment.

FIG. 1 is a perspective view of a jet pump slip joint repair assembly according to at least one example embodiment.

In at least one example embodiment, a jet pump slip joint repair assembly 10 includes a diffuser 17. The diffuser 17 is a generally cylindrical pipe including a bore extending therethrough. The diffuser 17 also includes a diffuser collar 18 surrounding an opening in the diffuser 17, and a clamping ring 60 extending around an outer circumference of the diffuser 17. A bushing 12 is inserted in the bore of the diffuser 17, such that a top portion of the bushing 12 extends at least partially from the diffuser collar 18. The bushing 12 is also generally cylindrical and is sized and configured to fit snugly within the diffuser collar 18. In at least one example embodiment, an inlet mixer 22 is partially inserted into bushing 12 and the bore of the diffuser 17. The inlet mixer 22 is a generally cylindrical pipe having a smaller outer diameter than an inner diameter of the bushing 12 and the diffuser collar 18.

In at least one example embodiment, the jet pump slip joint repair assembly 10 also includes at least one clamp 14. The jet pump slip joint repair assembly 10 may include two or more clamps (e.g., three clamps, four clamps, five clamps, or six clamps). In at least one example embodiment, the clamp 14 includes a gripping surface 40 and a gripping collar 42. The gripping surface 40 extends from a gripping body 45, which may be generally L-shaped. The shape of the gripping body 45, may be adjusted so that the gripping body 45 closely fits against an outer surface of the diffuser 17. A thickness of the gripping body 45 may vary along a length of the gripping body 45. In another example embodiment, the gripping body 45 has a substantially uniform thickness along a length thereof. A bolt 44 secures the gripping body 45 to the gripping collar 42. The gripping body 45 may have a generally square cross-section and may be received in a bore in the gripping collar 42 that also has a generally square cross-section. The square cross-section of the gripping body 45 and the bore of the gripping collar substantially prevent and/or reduce rotation of the securing portion 45.

In at least one example embodiment, at least about 2000 pounds force is applied to the seal 20 (shown in FIG. 2 and FIG. 6) so as to compress the seal 20. The jet pump slip joint repair assembly 10 may include four clamps 14, each clamp applying at least about 500 pounds force to the seal 20.

Figure 6:
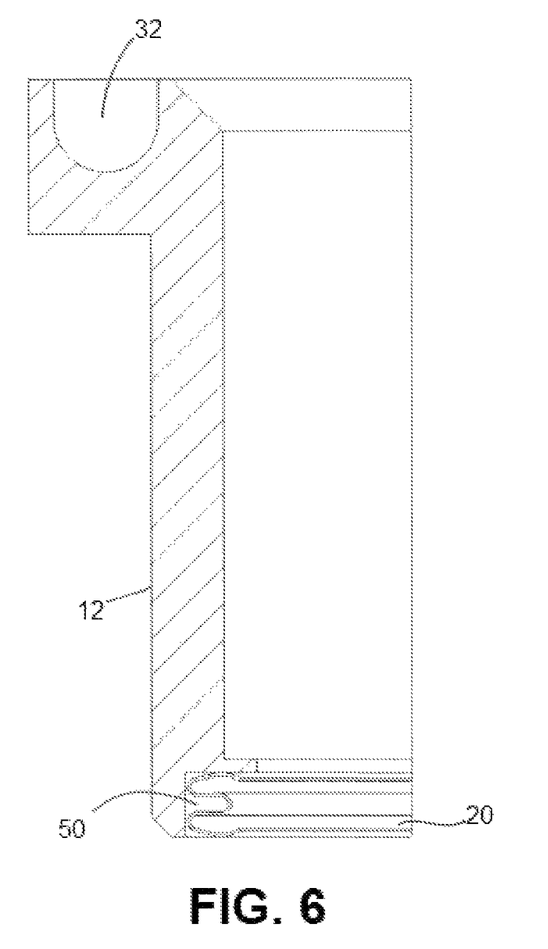
FIG. 6 is an enlarged, cross-sectional view of a portion of the bushing of FIG. 5 according to at least one example embodiment.

In at least one example embodiment, the gripping collar 42 is anchored to the clamping ring 60 of the diffuser 17. The gripping surface 40 of the clamp 14 engages a grooved flange 32 of the bushing 12. The clamp 14 is tightened via the bolt 44 to compress a seal 20 held in a seal groove 50 on an inner surface of the bushing 12 as shown in FIG. 6 and discussed below.

In at least one example embodiment, once the clamp 14 is in place, a slip joint clamp 16 is positioned around the slip joint to further secure the slip joint. Portions of the slip joint clamp 16 fit within cutouts 30 in the bushing 12. The slip joint clamp 16 may be the existing slip joint clamp used at the slip joint prior to adding the repair assembly 10 according to at least one example embodiment.

In at least one example embodiment, the bushing 12 and the clamp 14 are formed from stainless steel. Since stainless steel also forms many components of the jet pump, the use of stainless steel reduces concerns of thermal expansion once the slip joint is repaired.

Figure 2:
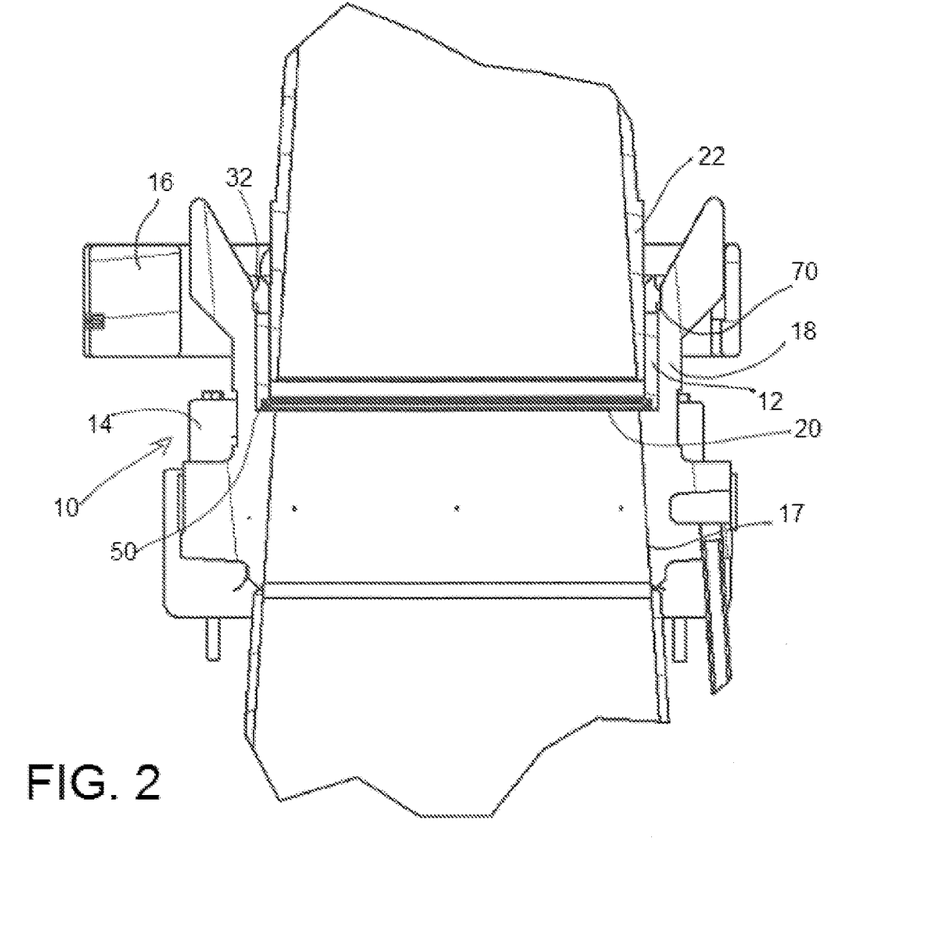
FIG. 2 is a cross-sectional view of the jet pump slip joint repair assembly of FIG. 1 according to at least one example embodiment.

FIG. 2 is a cross-sectional view of the jet pump slip joint repair assembly of FIG. 1 according to at least one example embodiment.

In at least one example embodiment, as shown in FIG. 2, the jet pump slip joint repair assembly 10 is generally the same as in FIG. 1, but the seal 20 is shown partially compressed in the seal groove 50 of the bushing 12 after the clamp 14 is secured to the bushing 12 and the clamping ring 60.

In at least one example embodiment, the seal 20 is formed of a flexible, metallic material. The seal 20 aids in preventing and/or reducing leaks between the diffuser 17 and the bushing 12 during operation of the jet pump (not shown). The leakage between the inlet mixer 22 and the bushing 12 is controlled by close tolerance machining that reduces, to the extent possible, the gap between the inlet mixer and the bushing.

In at least one example embodiment, when the bushing 12 is inserted in the bore of the diffuser 17, a gap 70 is formed between the grooved flange 32 of the bushing 12 and a top edge of the diffuser 17. Once the at least one clamp 14 is fully secured, the gap 70 is reduced in size and/or disappears. Thus, the gap 70 between the bushing 12 and the top edge of the diffuser 17 allows for visual assurance that full compression of the seal 20 is achieved. The seal groove 50 is sized such that when the bushing 12 bottoms out in the shoulder created in the diffuser collar 18, the seal 20 achieves full compression. If the gap 70 is closed, the seal 20 may not be fully compressed.

Figure 3:
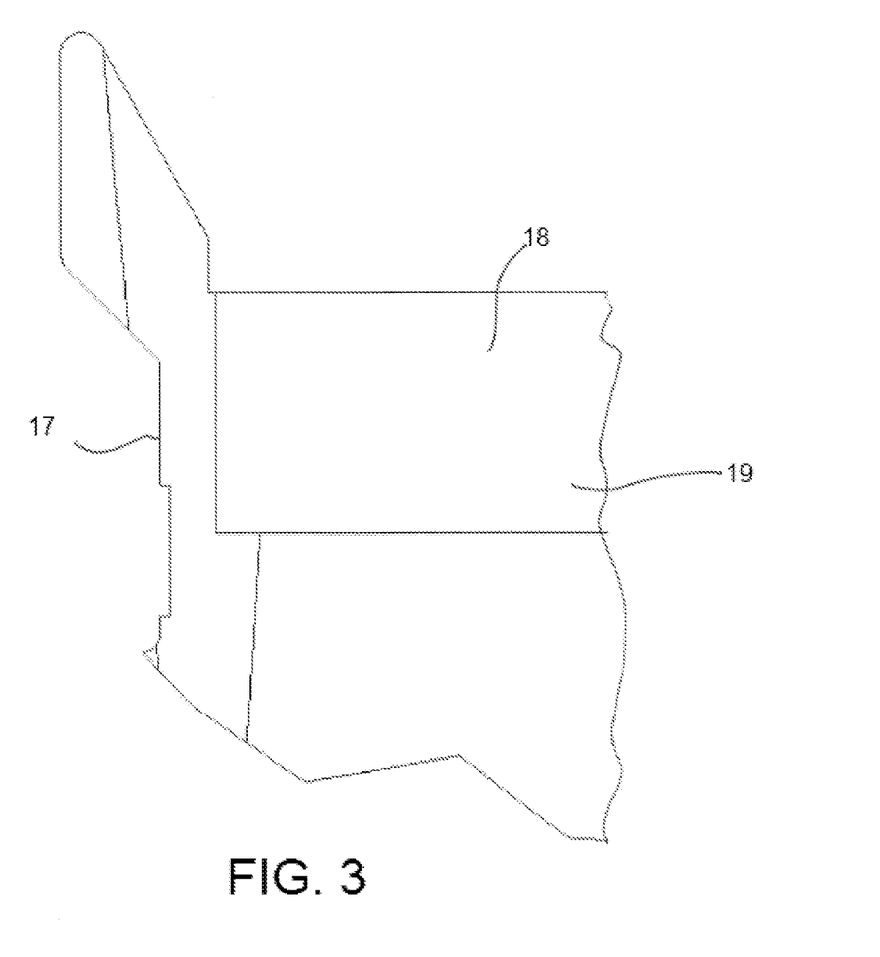
FIG. 3 is a cross-sectional view of a diffuser collar according to at least one example embodiment.

FIG. 3 is an enlarged cross-sectional view of a diffuser collar according to at least one example embodiment.

In at least one example embodiment, as shown in FIG. 3, an inner surface 19 of the diffuser collar 18 of the diffuser may be machined to form a substantially smooth, clean, and generally cylindrical surface. During vibration caused by leakage, the inner surface of the diffuser collar may become damaged. Thus, by machining the inner surface 19 of the diffuser collar 18, the damaged portion of the diffuser collar 18 may be removed so that the slip joint may be repaired.

Figure 4:
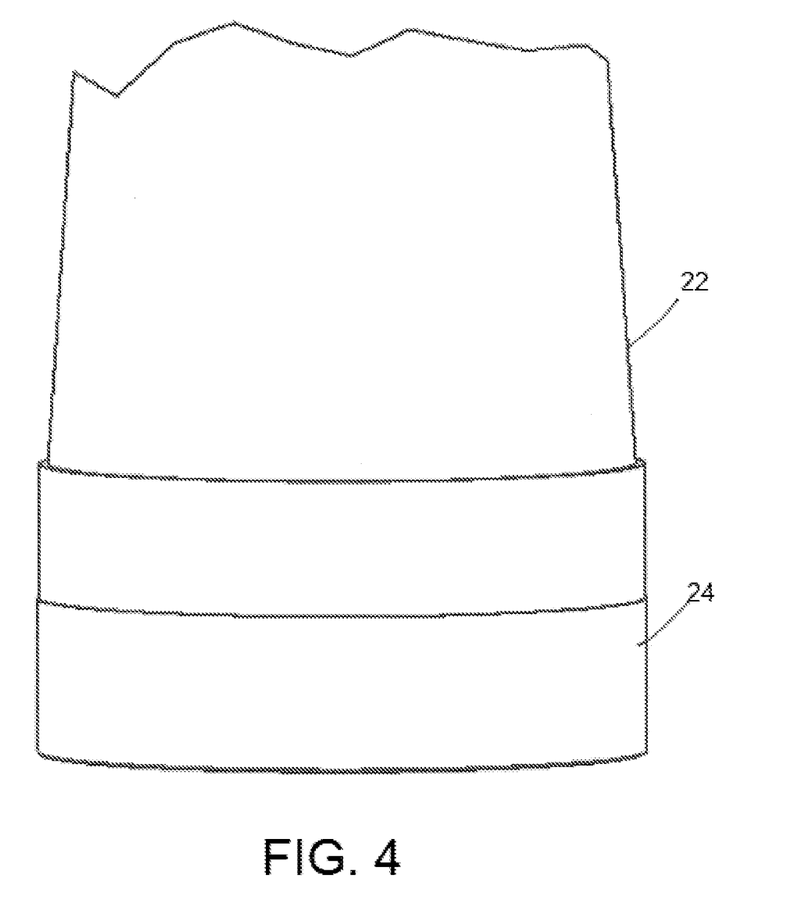
FIG. 4 is a side view of an inlet mixer according to at least one example embodiment.

FIG. 4 is a side view of an inlet mixer according to at least one example embodiment.

In at least one example embodiment, as shown in FIG. 4, an outer surface 24 of the inlet mixer 22 may be machined to create a clean, generally rounded surface. The machining removes damaged portions of the outer surface 24 to aid in preventing and/or reducing leaks.

Figure 5:
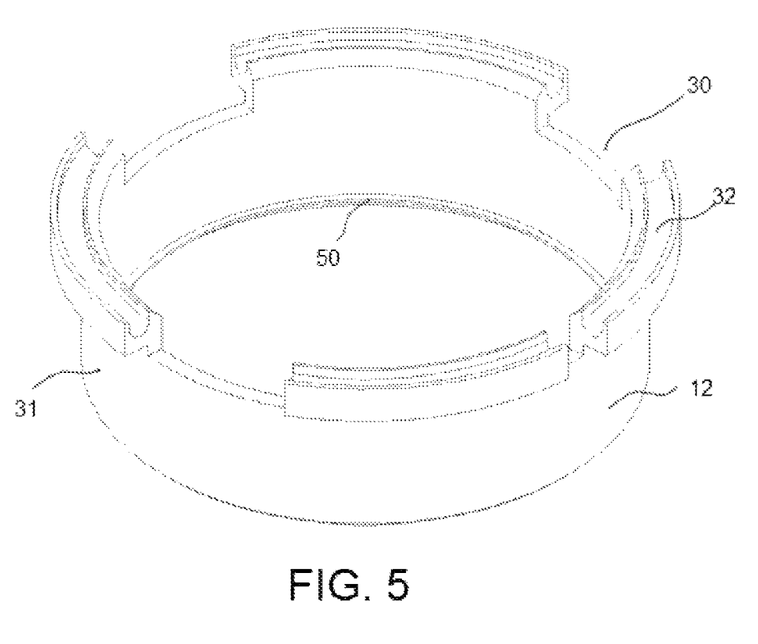
FIG. 5 is a perspective view of a bushing according to at least one example embodiment.

FIG. 5 is a perspective view of a bushing according to at least one example embodiment.

In at least one example embodiment, as shown in FIG. 5, the bushing 12 includes a generally cylindrical sidewall 31. The sidewall 31 is configured to surround the portion of the inlet mixer as shown in FIGS. 1 and 2 as described above. The grooved flange 32 is formed on an upper surface of the sidewall 31. The grooved flange 32 is sized and configured to receive the gripping surface 40 of the clamp 14.

In at least one example embodiment, the bushing 12 includes at least one cutout 30 between adjacent portions of the grooved flange 32. The at least one cutout 30 is sized and configured to provide clearance for portions of the slip joint clamp 16 and features attached to the top of the diffuser 17. The diffuser may include ears that aid in loading of the inlet mixer into the diffuser collar. The cutout 30 reduces and/or prevents interference between the ears and the bushing 12. The slip joint clamp 16 may be the original clamp provided about the slip joint 16 so as to reduce repair costs.

FIG. 6 is an enlarged, cross-sectional view of a portion of the bushing of FIG. 5 according to at least one example embodiment.

In at least one example embodiment, as shown in FIG. 6, the bushing 12 also includes the seal groove 50 on an inner, bottom surface of the sidewall 31.

In at least one example embodiment, the grooved flange 32 has a generally U-shaped cross-section so as to receive the gripping portion 40 of the clamp 14. The gripping portion 40 may have a generally U-shaped profile so that the gripping portion 40 is nested in the grooved flange 32.

In at least one example embodiment, the bushing 12, the seal 20, and the at least one clamp 14 could be sold and/or packaged as a repair kit for slip joint repair.

At least one example embodiment relates to a method of repairing a jet pump slip joint.

In at least one example embodiment, a method of repairing a jet pump slip joint includes removing a damaged inlet mixer from a bore of a diffuser. The method also includes machining an inner surface of the bore of the diffuser so as to remove damaged metal and form a substantially smooth inner surface, and machining an outer surface of the inlet mixer so as to remove damaged metal from the inlet mixer and form a substantially smooth outer surface. The method may also include inserting a bushing in the bore of the diffuser. The bushing includes a grooved flange on an upper surface. The grooved flange is configured to receive a gripping portion of a clamp. The bushing also includes an internal groove on an inner, bottom surface of the bushing. A seal is inserted in the internal groove of the bushing.

In at least one example embodiment, the method may also include inserting the inlet mixer through the bushing and into the bore of the diffuser. The method may also include clamping the bushing to a collar of the diffuser such that the seal is compressed. The method may also include inserting the gripping portion of the clamp in the grooved flange of the upper surface of the bushing, and securing a gripping collar to the collar of the diffuser.

In at least one example embodiment, the method may also include mounting a slip joint clamp around the bushing, the diffuser, and the inlet mixer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A jet pump slip joint repair assembly comprising:
   at least one clamp, the clamp including,
      a gripping surface,
      a gripping body, and
      a gripping collar, the gripping surface extending from the gripping body,
   the gripping body configured to be inserted in the gripping collar;
   a bushing configured to be inserted in a bore of a diffuser and to surround a portion of an inlet mixer, the bushing including,
      a generally cylindrical sidewall, the sidewall configured to surround the portion of the inlet mixer,
      a grooved flange on an upper surface of the sidewall, the grooved flange configured to receive the gripping surface of the clamp,
      at least one cutout between adjacent portions of the grooved flange, the at least one cutout configured to receive at least one portion of a slip joint clamp, and
      a groove on an inner, bottom surface of the sidewall; and
   a seal in the groove, the seal being flexible and formed of a metallic material, the seal configured to be compressed when the at least one clamp engages the bushing.

2. The jet pump slip joint repair assembly of claim 1, wherein the assembly includes at least two clamps.

3. The jet pump slip joint repair assembly of claim 2, wherein the at least two clamps apply at least about 2,000 pounds force to the bushing.

4. The jet pump slip joint repair assembly of claim 1, wherein when the bushing is inserted in the bore of the diffuser, a gap is formed between the grooved flange of the bushing and a top edge of the diffuser.

5. The jet pump slip joint repair assembly of claim 1, wherein the gripping body has a generally square-shaped cross-section so as to reduce rotation of the gripping body in relation to the gripping collar.

6. The jet pump slip joint repair assembly of claim 1, wherein the gripping body has a generally non-round cross-section so as to reduce rotation of the gripping body in relation to the gripping collar.

7. A jet pump slip joint comprising:
   a diffuser including a bore extending therethrough, an inner surface of the bore having a substantially smooth surface;
   a bushing inserted in the bore, the bushing including,
      a generally cylindrical sidewall,
      a grooved flange on an upper surface of the sidewall, the grooved flange configured to receive a gripping surface of a clamp,
      at least one cutout between adjacent portions of the grooved flange, and
      a groove on an inner, bottom surface of the sidewall;
   a seal inserted in the groove of the bushing;
   an inlet mixer inserted into the sidewall of the bushing and the bore of the diffuser; and
   at least one clamp engaged with the diffuser and the bushing, the at least one clamp configured to compress the seal.

8. The jet pump slip joint of claim 7, wherein the seal is formed of a flexible, metallic material.

9. The jet pump slip joint of claim 7, wherein the at least one clamp comprises:
   a gripping surface; and
   a gripping collar.

10. The jet pump slip joint of claim 9, wherein the gripping surface extends from a gripping body.

11. The jet pump slip joint of claim 10, wherein the gripping body has a generally square-shaped cross-section so as to reduce rotation of the gripping body in relation to the gripping collar.

12. The jet pump slip joint of claim 10, wherein the gripping body has a generally non-round cross-section so as to reduce rotation of the gripping body in relation to the gripping collar.

13. The jet pump slip joint of claim 7, further comprising:
   a gap between the grooved flange of the bushing and a top edge of the diffuser.

14. The jet pump slip joint of claim 7, further comprising:
   a slip joint clamp extending at least partially around the diffuser and the inlet mixer, at least a portion of the slip joint clamp positioned within the at least one cutout of the bushing.

* * * * *